(12) United States Patent
Xu et al.

(10) Patent No.: US 11,166,189 B2
(45) Date of Patent: Nov. 2, 2021

(54) DATA TRANSMISSION BUFFER DISCARDING METHOD AND APPARATUS

(71) Applicant: HUAWEI TECHNOLOGIES CO., LTD., Shenzhen (CN)

(72) Inventors: Bin Xu, Beijing (CN); Zhenzhen Cao, Beijing (CN); Haifeng Yu, Beijing (CN); Bingzhao Li, Beijing (CN); Xuelong Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 97 days.

(21) Appl. No.: 16/657,561

(22) Filed: Oct. 18, 2019

(65) Prior Publication Data
US 2020/0053590 A1    Feb. 13, 2020

Related U.S. Application Data

(63) Continuation of application No. PCT/CN2018/083839, filed on Apr. 20, 2018.

(30) Foreign Application Priority Data

Apr. 20, 2017    (CN) .......................... 201710261405.4

(51) Int. Cl.
*H04W 72/04*     (2009.01)
*H04W 28/02*     (2009.01)
(Continued)

(52) U.S. Cl.
CPC ....... *H04W 28/0263* (2013.01); *H04L 47/215* (2013.01); *H04L 47/32* (2013.01);
(Continued)

(58) Field of Classification Search
CPC ......... H04W 28/0263; H04W 28/0257; H04W 47/215; H04W 47/32; H04W 47/29;
(Continued)

(56) References Cited

U.S. PATENT DOCUMENTS 6,424,624 B1 * 7/2002 Galand ............... H04L 12/5601
370/231
2006/0126507 A1 * 6/2006 Nakayasu ............... H04L 47/14
370/229
(Continued)

FOREIGN PATENT DOCUMENTS

CN    101034344 A    9/2007
CN    101656585 A    2/2010
(Continued)

OTHER PUBLICATIONS

Huawei et al.,"LCP for small cell enhancement",3GPP TSG-RAN WG2 Meeting #85 R2-140057,Prague, Czech Republic Feb. 10-14, 2014,total 3 pages.
(Continued)

*Primary Examiner* — Hassan Kizou
*Assistant Examiner* — Mahbubul Bar Chowdhury
(74) *Attorney, Agent, or Firm* — Hauptman Ham, LLP

(57) ABSTRACT

This disclosure provides a data transmission method and apparatus. The method includes: determining a data flow mapped onto a data radio bearer (DRB); and controlling a transmission rate of the data flow based on the transmission rate of the data flow and a first rate threshold of the data flow. This disclosure provides the data transmission method and apparatus, to control the transmission rate of the data flow mapped onto the DRB.

14 Claims, 6 Drawing Sheets

200

Determine a data flow mapped onto a data radio bearer DRB — S210

Control a transmission rate of the data flow based on the transmission rate of the data flow and a first rate threshold of the data flow — S220

(51) Int. Cl.
*H04L 12/819* (2013.01)
*H04L 12/823* (2013.01)
*H04W 28/22* (2009.01)
*H04W 80/08* (2009.01)

(52) U.S. Cl.
CPC ....... *H04W 28/0268* (2013.01); *H04W 28/22* (2013.01); *H04W 80/08* (2013.01)

(58) Field of Classification Search
CPC . H04W 28/0268; H04W 28/22; H04W 80/08; H04W 80/02
See application file for complete search history.

(56) References Cited

U.S. PATENT DOCUMENTS

| | | | | |
|---|---|---|---|---|
| 2009/0116391 | A1* | 5/2009 | Bakker | H04W 28/12 370/235 |
| 2009/0245108 | A1* | 10/2009 | Wu | H04L 47/263 370/233 |
| 2012/0044805 | A1 | 2/2012 | Lee et al. | |
| 2013/0114497 | A1* | 5/2013 | Zhang | H04W 4/06 370/312 |
| 2016/0142902 | A1* | 5/2016 | Ramamurthi | H04L 65/80 370/328 |
| 2016/0142933 | A1 | 5/2016 | Rastogi et al. | |
| 2018/0279336 | A1* | 9/2018 | Yang | H04W 76/10 |

FOREIGN PATENT DOCUMENTS

| | | | |
|---|---|---|---|
| CN | 101873192 | A | 10/2010 |
| CN | 101621457 | B * | 5/2012 |
| CN | 105517047 | A | 4/2016 |
| CN | 106559842 | A * | 4/2017 |
| CN | 106559842 | A | 4/2017 |

OTHER PUBLICATIONS

Huawei et al.,"Flow Level QoS Control",3GPP TSG-RAN WG2 Meeting #97bis R2-1702592,Spokane, USA, Apr. 3-7, 2017,total 3 pages.

Extended European search report dated Feb. 18, 2020 from corresponding application No. EP 18787277.5.

International search report dated Jul. 6, 2018 from corresponding application No. PCT/CN2018/083839.

* cited by examiner

200

| Determine a data flow mapped onto a data radio bearer DRB | ∼S210 |

| Control a transmission rate of the data flow based on the transmission rate of the data flow and a first rate threshold of the data flow | ∼S220 |

DATA TRANSMISSION BUFFER DISCARDING METHOD AND APPARATUS

CROSS-REFERENCE TO RELATED APPLICATIONS

This application is a continuation of International Application No. PCT/CN2018/083839, filed on Apr. 20, 2018, which claims priority to Chinese Patent Application No. 201710261405.4, filed on Apr. 20, 2017. The disclosures of the aforementioned applications are hereby incorporated by reference in their entireties.

TECHNICAL FIELD

This application relates to the communications field, and more specifically, to a data transmission method and apparatus in the communications field.

BACKGROUND

In a long term evolution (long term evolution, LTE) system, at least one data radio bearer (data radio bearer, DRB) may be used to bear user plane data by a terminal device and a base station. The base station configures a prioritized bit rate (prioritized bit rate, PBR) for a logical channel of the DRB based on a DRB. Therefore, it is ensured that a transmission rate within each DRB can meet a guaranteed bit rate (guaranteed bit rate GBR) of the base station.

In an existing data transmission method, the base station may configure the PBR for the DRB with reference to a GBR requirement of the DRB, to ensure that the transmission rate within the DRB can meet the GBR requirement. In other words, the existing data transmission is controlled based on a DRB.

In a fifth generation (fifth generation, 5G) wireless communications system, a quality of service flow (quality of service flow, QoS flow) defined in a core network may be referred to as a data flow. On a core network side, at least one data flow may be mapped onto each protocol data unit (Protocol Data Unit, PDU) session (session). On a radio access network (radio access network, RAN) side, at least one data flow may be mapped onto each DRB. In the core network, a guaranteed flow bit rate (guaranteed flow bit rate, GFBR) is configured for each data flow mapped onto the DRB, and a maximum flow bit rate (maximum flow bit rate, MFBR) is limited for each data flow. A data flow is a data transmission granularity smaller than a granularity of a DRB.

Currently, there is no data transmission control method at a level of a data flow.

SUMMARY

This application provides a data transmission method and apparatus, to control a transmission rate of a data flow mapped onto a DRB.

According to a first aspect, this application provides a data transmission method. The method includes:
determining a data flow mapped onto a data radio bearer DRB; and controlling a transmission rate of the data flow based on the transmission rate of the data flow and a first rate threshold of the data flow.

It should be understood that the data flow in this embodiment of this application may be a QoS flow defined in a core network. This is not limited in this embodiment of this application.

It should be further understood that the first rate threshold of the data flow may be, for example, a GFBR of the data flow.

It should also be understood that a first rate threshold of each of at least one data flow mapped onto the DRB may be separately configured. In other words, the first rate thresholds of the data flows may be the same or different. This is not limited in this embodiment of this application.

According to the data transmission method provided in this embodiment of this application, the data flow mapped onto the DRB can be identified, and the transmission rate of the data flow can be controlled.

In addition, the transmission rate of the data flow mapped onto the DRB is controlled, to avoid the following case in which a transmission rate of another data flow cannot meet a first rate threshold of the another data flow because an overload of the transmission rate of the data flow affects the transmission rate of the another data flow.

In a possible implementation, the controlling a transmission rate of the data flow based on the transmission rate of the data flow and a first rate threshold of the data flow includes: controlling, based on the transmission rate of the data flow and the first rate threshold of the data flow, a transmission rate of the data flow when being transmitted to a packet data convergence protocol PDCP layer; or controlling, based on the transmission rate of the data flow and the first rate threshold of the data flow, a transmission rate of the data flow when being transmitted to a medium access control MAC layer.

It should be understood that the data transmission method provided in this embodiment of this application is performed by a transmit end of data. The method may be applied in an uplink data transmission scenario, and may also be applied in a downlink data transmission scenario. In the uplink data transmission scenario, the transmit end may be a terminal device. In the downlink data transmission scenario, the transmit end may be a network device, and the network device may be, for example, a base station.

It should also be understood that the data transmission method provided in this embodiment of this application may be performed by the transmit end at a layer. The layer may be a layer located above the packet data convergence protocol (packet data convergence protocol, PDCP) layer, or may be the MAC layer. This is not limited in this embodiment of this application.

Optionally, the layer located above the PDCP layer may be a service data adaptation protocol (service data adaption protocol, SDAP) layer. However, this embodiment of this application is not limited thereto.

It should also be understood that the first rate threshold of the data flow may be, for example, a (WEIR of the data flow.

According to the data transmission method provided in this embodiment of this application, the transmit end may control, at the SDAP layer, a transmission rate of the data flow when being transmitted to the PDCP layer. Alternatively, the transmit end may control, at the MAC layer, a transmission rate of the data flow when being transmitted to the MAC layer.

In another possible implementation, the controlling a transmission rate of the data flow based on the transmission rate of the data flow and a first rate threshold of the data flow includes: when a quantity of tokens in a token bucket corresponding to the data flow is greater than or equal to a token threshold, transmitting the data flow, where the quantity of tokens is a difference between a first value and a second value, the first value is a quantity of tokens put into the token bucket in a first time period based on the first rate threshold of the data flow and the second value is a quantity of tokens taken from the token bucket in the first time period based on the transmission rate of the data flow; and/or when the quantity of tokens in the token bucket is less than the token threshold, suspending transmission of the data flow.

It should be understood that the token threshold may be 0, or may be a non-zero value. This is not limited in this embodiment of this application.

It should also be understood that a start moment of the first time period is a moment at which a token is put into the token bucket according to the first rate threshold, and an end moment of the first time period is a moment at which the transmit end determines, based on the quantity of tokens in the token bucket, whether to transmit.

According to the data transmission method provided in this embodiment of this application, the transmit end can control the transmission rate of the data flow based on a relationship between the token threshold and the quantity of tokens in the token bucket corresponding to the data flow. In this way, the transmission rate of the data flow can meet the first rate threshold of the data flow. In other words, the transmission rate of the data flow can meet the GFBR of the data flow.

In still another possible implementation, the controlling a transmission rate of the data flow based on the transmission rate of the data flow and a first rate threshold of the data flow includes: controlling the transmission rate of the data flow based on the transmission rate of the data flow, the first rate threshold of the data flow, and a second rate threshold of the data flow, where the second rate threshold of the data flow is greater than or equal to the first rate threshold of the data flow.

It should be understood that the second rate threshold of the data flow may be, for example, an MFBR of the data flow.

According to the data transmission method provided in this embodiment of this application, the transmit end controls the transmission rate of the data flow based on the transmission rate of the data flow, the first rate threshold of the data flow, and the second rate threshold of the data flow. In this way, the transmission rate of the data flow can meet the first rate threshold of the data flow and the second rate threshold of the data flow in other words, the transmission rate of the data flow can meet the GFBR and the MFBR.

In still another possible implementation, the controlling the transmission rate of the data flow based on the transmission rate of the data flow the first rate threshold of the data flow and a second rate threshold of the data flow includes: determining M data packets in the data flow based on the transmission rate of the data flow, the first rate threshold of the data flow, and the second rate threshold of the data flow in a first transmission period, where M is an integer greater than 0; and buffering the M data packets.

According to the data transmission method provided in this embodiment of this application, in the first transmission period, when the transmission rate of the data flow is greater than the first rate threshold of the data flow, the M data packets are buffered. In this way, the transmission rate of the data flow in the transmission period can be effectively reduced, to avoid the following case in which transmission rate of another data flow is affected because the transmission rate of the data flow is extremely high.

In still another possible implementation, the determining M data packets in the data flow based on the transmission rate of the data flow, the first rate threshold of the data flow, and the second rate threshold of the data flow in a first transmission period includes: in the first transmission period, when the transmission rate of the data flow is greater than the first rate threshold of the data flow and is less than or equal to the second rate threshold of the data flow, determining the M data packets, where M is a difference between a quantity of data packets that can be transmitted according to the transmission rate of the data flow and a quantity of data packets that can be transmitted according to the first rate threshold of the data flow.

It should be understood that the transmission rate of the data flow may be understood as a data volume transmitted in a transmission period. The transmission period may be, for example, a transmission time interval (transmission time interval, TTI). However, this is not limited in this embodiment of this application.

In still another possible implementation, if a plurality of data flows are mapped onto the DRB, and the plurality of data flows include the data flow and another data flow, the determining M data packets in the data flow based on the transmission rate of the data flow, the first rate threshold of the data flow, and the second rate threshold of the data flow in a first transmission period includes: in the first transmission period, when the transmission rate of the data flow is greater than the first rate threshold of the data flow and is less than or equal to the second rate threshold of the data flow, determining P data packets in the data flow, where P is a difference between a quantity of data packets that can be transmitted according to the transmission rate of the data flow and a quantity of data packets that can be transmitted according to the first rate threshold of the data flow, and P is an integer greater than 0; and determining the M data packets in the P data packets based on a transmission rate of the another data flow and a first rate threshold of the another data flow, where a difference between P and M is a difference between a quantity of data packets that can be transmitted according to the first rate threshold of the another data flow and a quantity of data packets that can be transmitted according to the transmission rate of the another data flow.

Optionally, the transmit end may process, in different manners, the M data packets buffered in the first transmission period. For example, the transmit end may preferably transmit the M data packets, or may transmit the M data packets when the transmission rate of the data flow is relatively low or may directly discard the M data packets. This is not limited in this embodiment of this application.

In still another possible implementation, after the buffering the M data packets, the method further includes: preferably transmitting the M data packets in a second transmission period, where an end moment of the first transmission period is a start moment of the second transmission period.

In still another possible implementation, after the buffering the M data packets, the method further includes: transmitting the M data packets in a third transmission period, where the third transmission period is later than the first transmission period, and the transmission rate of the data flow is less than the first rate threshold of the data flow in the third transmission period.

According to the data transmission method provided in this embodiment of this application, a data packet buffered in the first transmission period is transmitted in another transmission period that meets a transmission condition. In this way, a packet loss rate of data transmission can be reduced, thereby improving reliability of data transmission.

In still another possible implementation, after the buffering the M data packets, the method further includes: in a preset second time period, if the transmission rate of the data flow is greater than or equal to the first rate threshold of the data flow, discarding the M data packets after the second time period ends.

According to the data transmission method provided in this embodiment of this application, after the second time period after the first transmission period expires, the data packet buffered in the first transmission period is discarded. In this way, an expired buffer can be cleared in time, to avoid the following case in which a new data packet cannot be buffered because an expired data packet occupies a buffer, that is, to improve a buffer update rate.

In still another possible implementation, the method further includes: in the first transmission period, if the transmission rate of the data flow is greater than the second rate threshold of the data flow, discarding N data packets in the data flow, where N is a difference between the quantity of data packets that can be transmitted according to the transmission rate of the data flow and a quantity of data packets that can be transmitted according to the second rate threshold of the data flow, and N is an integer greater than 0.

According to the data transmission method provided in this embodiment of this application, in the first transmission period, when the transmission rate of the data flow is greater than the second rate threshold of the data flow, the N data packets are discarded. In this way, the transmission rate of the data flow in the transmission period can be effectively reduced, to avoid the following case in which the transmission rate of the another data flow is affected because the transmission rate of the data flow is extremely high.

In still another possible implementation, the data flow is obtained after at least one of the following processing: data packet header compression processing or data packet concatenation processing.

It should be understood that the data packet header compression processing may mean performing packet header compression on each different data packet in a data flow at an SDAP layer according to a packet header compression algorithm. The packet header compression algorithm may be a robust header compression (robust header compression, ROHC) algorithm or another packet header compression algorithm.

It should also be understood that the data packet concatenation processing means concatenating a plurality of upper layer data packets (which may be IP packets or non-IP packets) into one SDAP service data unit (service data unit, SDU) at an SDAP layer, and then adding a corresponding header for transmission. Further, concatenation may be performed on a fixed-size IP packet.

According to the data transmission method provided in this embodiment of this application, the data packet header compression processing and/or the data packet concatenation processing are/is performed on the data packet in the data flow. In this way, a transmission data volume of the data packet in the data flow can be reduced, thereby improving transmission efficiency of the data flow.

According to a second aspect, this application provides another data transmission method. The method includes:

obtaining data transmission information of a terminal device, where the data transmission information includes a transmission rate of each of at least one data flow mapped onto a data radio bearer DRB of the terminal device;

determining a target prioritized bit rate PBR of the DRB based on the data transmission information; and sending indication information to the terminal device, where the indication information is used to indicate the target PBR and control a transmission rate of the DRB by using the target PBR.

According to the data transmission method provided in this embodiment of this application, a network device determines the target PBR of the DRB based on the data transmission information, and sends the indication information to the terminal device. The indication information is used to indicate the target PBR and control the transmission rate of the DRB by using the target PBR. In other words, the network device can dynamically adjust the target PBR for the terminal device based on a current transmission status of the terminal device.

Optionally, the data transmission information may include information used to indicate a transmission status of the at least one data flow mapped onto the DRB. For example, the data transmission information may include at least one of the following: the transmission rate of each of the at least one data flow, a difference between a sum of transmission rates of all of the at least one data flow and a sum of first rate thresholds of all the data flows, or a data volume buffered by each of the at least one data flow during transmission. The target PBR is determined. This is not limited in this embodiment of this application.

In another possible implementation, the data transmission information includes the transmission rate of each of the at least one data flow mapped onto the DRB, and the determining a target PBR of the DRB based on the data transmission information includes: determining the target PBR based on the transmission rate of each of the at least one data flow and a first rate threshold of each data flow.

It should be understood that the first rate threshold may be a GFBR.

In still another possible implementation, the data transmission information includes the difference between the sum of transmission rates of all of the at least one data flow mapped onto the DRB and the sum of first rate thresholds of all the data flows, and the determining a target PBR of the DRB based on the data transmission information includes: determining the target PBR based on the difference between the sum of transmission rates of all of the at least one data flow and the sum of first rate thresholds of all the data flows.

In still another possible implementation, if at least one data packet is buffered in a transmission process of the data flow mapped onto the DRB, the method further includes: receiving buffer information reported by the terminal device, where the buffer information includes a data volume buffered in a transmission process of each of the at least one data flow. The determining a target PBR of the DRB based on the data transmission information includes: determining the target PBR based on the data transmission information and the buffer information.

According to the data transmission method provided in this embodiment of this application, the network device determines the target PBR based on both a transmission status and a buffer status of each of the at least one data flow that is mapped onto the DRB and that is of the terminal device. In this way, accuracy of determining the target PBR is improved.

Optionally, the indication information may further include at least one of the following: a start effective time, an effective time duration, an end effective time, an effective rule, or a failure rule of controlling transmission of the DRB by using the target PBR.

According to the data transmission method provided in this embodiment of this application, the network device indicates the effective time period of the target PBR to the terminal device by using the indication information, so that the terminal device uses the target PBR in the effective time period. Therefore, time validity of the target PBR is improved.

According to a third aspect, this application provides still another data transmission method. The method includes:

sending data transmission information to a network device, where the data transmission information includes a transmission rate of each of at least one data flow mapped onto a data radio bearer DRB of a terminal device;

receiving indication information sent by the network device based on the data transmission information, where the indication information is used to indicate a target PBR and control a transmission rate of the DRB by using the target PBR; and determining the target PBR based on the indication information, and controlling the transmission rate of the DRB by using the target PBR.

According to the data transmission method provided in this embodiment of this application, when the target PBR is greater than or equal to a current PBR of the DRB, after receiving the indication information, the terminal device determines the target PBR based on the indication information, updates the current PBR to the target PBR, and controls transmission of the DRB based on the target PBR. Because the PBR is increased, even if a transmission rate of a data flow mapped onto the DRB is greater than a GFBR, the transmission rate of the data flow is not needed to be controlled. In other words, the terminal device does not need to perform buffering or packet discarding processing on the data flow. This helps reduce a transmission latency and a packet loss rate of the data flow, and helps avoid affecting a transmission rate of another data flow.

According to the data transmission method provided in this embodiment of this application, when the target PBR is less than the current PBR of the DRB, after receiving the indication information, the terminal device determines the target PBR based on the indication information, updates the current PBR to the target PBR, and controls the transmission of the DRB based on the target PBR. Because the PBR is reduced, a reduced part of the PBR may be allocated to another DRB, that is, an excess part of the PBR allocated to the current DRB is allocated to the another DRB. In this way, PBR utilization can be improved while the transmission rate of the DRB is ensured. Optionally, a person in the art may decide, based on an actual requirement, an action taken when the target PBR is less than the current PBR of the DRB, for example, suspending sending of the indication information.

Optionally, the data transmission information may include information used to indicate a transmission status of the at least one data flow mapped onto the DRB. For example, the data transmission information may include at least one of the following: the transmission rate of each of the at least one data flow, a difference between a sum of transmission rates of all of the at least one data flow and a sum of first rate thresholds of all the data flows, or a data volume buffered in a transmission process of each of the at least one data flow. The target PBR is determined. This is not limited in this embodiment of this application.

It should be understood that the first rate threshold may be a GFBR.

In a possible implementation, if at least one data packet is buffered in a transmission process of the data flow mapped onto the DRB, the method further includes: reporting buffer information to the network device, where the buffer information includes a data volume buffered in a transmission process of each of the at least one data flow mapped onto the DRB. The receiving indication information sent by the network device based on the data transmission information includes: receiving the indication information sent by the network device based on the data transmission information and the buffer information.

Optionally, the indication information may further include at least one of the following: a start effective time, an effective time duration, an end effective time, an effective rule, or a failure rule of controlling the transmission of the DRB by using the target PBR.

Optionally, the terminal device may control the transmission rate of the DRB by using the target PBR in the effective time period, and control the transmission rate of the DRB by still using the PBR before update after the effective time period indicated by the indication information ends. Therefore, time vitality of the target PBR is improved.

According to a fourth aspect, this application provides a data transmission apparatus. The apparatus includes:

a determining unit, configured to determine a data flow mapped onto a data radio bearer DRB; and a processing unit, configured to control a transmission rate of the data flow based on the transmission rate of the data flow determined by the determining unit and a first rate threshold of the data flow.

In a possible implementation, the apparatus is further configured to perform the method in any possible implementation of the first aspect. Specifically, the apparatus includes a unit configured to perform the method in any possible implementation of the first aspect.

According to a fifth aspect, this application provides another data transmission apparatus. The apparatus includes:

an obtaining unit, configured to obtain data transmission information of a terminal device, where the data transmission information includes a transmission rate of each of at least one data flow mapped onto a data radio bearer DRB of the terminal device;

a processing unit, configured to determine a target prioritized bit rate PBR of the DRB based on the data transmission information obtained by the obtaining unit; and a sending unit, configured to send indication information to the terminal device, where the indication information is used to indicate the target PBR and control a transmission rate of the DRB by using the target PBR.

In a possible implementation, the apparatus is further configured to perform the method in any possible implementation of the second aspect. Specifically, the apparatus includes a unit configured to perform the method in any possible implementation of the second aspect.

According to a sixth aspect, this application provides still another data transmission apparatus. The apparatus includes:

a sending unit, configured to send data transmission information to a network device, where the data transmission information includes a transmission rate of each of at least one data flow mapped onto a data radio bearer DRB of a terminal device;

a receiving unit, configured to receive indication information sent by the network device based on the data transmission information sent by the sending unit, where the indication information is used to indicate a target PBR and control a transmission rate of the DRB by using the target PBR; and a processing unit, configured to: determine the target PBR based on the indication information received by the receiving unit, and control the transmission rate of the DRB by using the target PBR.

In a possible implementation, the apparatus is further configured to perform the method in any possible implementation of the third aspect. Specifically, the apparatus includes a unit configured to perform the method in any possible implementation of the third aspect.

According to a seventh aspect, this application provides still another data transmission apparatus. The apparatus includes a memory, a processor, and a computer program that is stored in the memory and that can run on the processor. When executing the computer program, the processor implements the following steps: determining a data flow mapped onto a data radio bearer DRB; and controlling a transmission rate of the data flow based on the transmission rate of the data flow and a first rate threshold of the data flow.

In a possible implementation, the apparatus is further configured to perform the method in any possible implementation of the first aspect.

According to an eighth aspect, this application provides still another data transmission apparatus. The apparatus includes a memory, a processor, a transceiver, and a computer program that is stored in the memory and that can run on the processor. When executing the computer program, the processor implements the following steps: obtaining data transmission information of a terminal device, where the data transmission information includes a transmission rate of each of at least one data flow mapped onto a data radio bearer DRB of the terminal device; determining a target prioritized bit rate PBR of the DRB based on the data transmission information; and sending indication information to the terminal device by using the transceiver, where the indication information is used to indicate the target PBR and control a transmission rate of the DRB by using the target PBR.

In a possible implementation, the apparatus is further configured to perform the method in any possible implementation of the second aspect.

According to a ninth aspect, this application provides still another data transmission apparatus. The apparatus includes a memory, a processor, a transceiver, and a computer program that is stored in the memory and that can nut on the processor. When executing the computer program, the processor implements the following steps: sending data transmission information to a network device by using the transceiver, where the data transmission information includes a transmission rate of each of at least one data flow mapped onto a data radio bearer DRB of a terminal device; receiving, by using the transceiver, indication information sent by the network device based on the data transmission information, where the indication information is used to indicate the target PBR and control a transmission rate of the DRB by using the target PBR; and determining the target PBR based on the indication information, and controlling the transmission rate of the DRB by using the target PBR.

In a possible implementation, the apparatus is further configured to perform the method in any possible implementation of the third aspect.

According to a tenth aspect, this application provides a computer readable medium, configured to store a computer program, and the computer program includes an instruction used to perform the method in the first aspect or any possible implementation of the first aspect.

According to an eleventh aspect, this application provides a computer readable medium, configured to store a computer program, and the computer program includes an instruction used to perform the method in the second aspect or any possible implementation of the second aspect.

According to a twelfth aspect, this application provides a computer readable medium, configured to store a computer program, and the computer program includes an instruction used to perform the method in the third aspect or any possible implementation of the third aspect.

According to a thirteenth aspect, this application provides a computer program product that includes an instruction, and when the computer program product runs on a computer, the computer performs the method in the first aspect or in various implementations of the first aspect.

According to a fourteenth aspect, this application provides a computer program product that includes an instruction, and when the computer program product runs on a computer, the computer performs the method in the second aspect or in various implementations of the second aspect.

According to a fifteenth aspect, this application provides a computer program product that includes an instruction, and when the computer program product runs on a computer, the computer performs the method in the third aspect or in various implementations of the third aspect.

DESCRIPTION OF EMBODIMENTS

The following describes technical solutions of this application with reference to accompanying drawings.

Figures 1, 2:
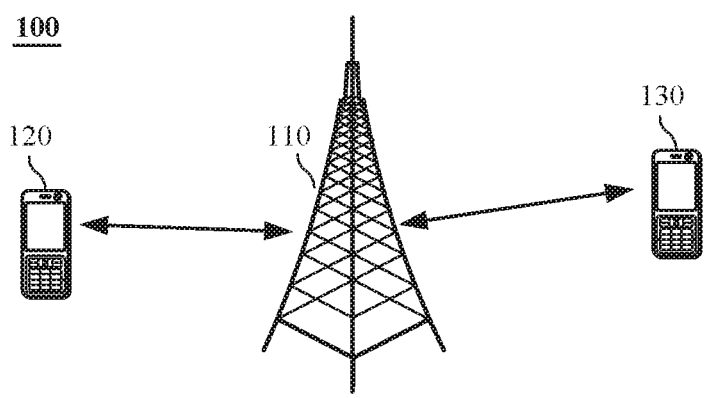
FIG. 1 shows an example architecture of a wireless communications system according to an embodiment of this application.
FIG. 2 is a schematic flowchart of a data transmission method according to an embodiment of this application.

FIG. 1 shows a wireless communications system 100 to which the embodiments of this application are applied. The wireless communications system 100 may include at least one network device. FIG. 1 shows a network device 110. The network device 110 may provide communication coverage for a specific geographic area, and may communicate with a terminal device located in the coverage area. The network device 110 may be a base transceiver station (base transceiver station, BTS) in a GSM system or a CDMA system, a nodeB (nodeB, NB) in a WCDMA system, an evolved nodeB (evolved NodeB, eNB or eNodeB) in an ITE system, or a radio controller in a cloud radio access network (cloud radio access network, CRAN). Alternatively, the network device may be a core network, a relay station, an access point, a vehicle-mounted device, a wearable device, a network-side device in a future 5G network, a network device in a future evolved public land mobile network (public land mobile network, MAIN), or the like.

The wireless communications system 100 further includes a plurality of terminal devices located in the coverage of the network device 110. FIG. 1 shows a first terminal device 120 and a second terminal device 130.

FIG. 1 shows one network device and two terminal devices as an example. Optionally, the wireless communications system 100 may include a plurality of network devices, and another quantity of terminal devices may be included in coverage of each network device. This is not limited in the embodiments of this application. Optionally, the wireless communications system 100 may further include another network entity, such as a network controller or a mobility management entity. The embodiments of this application are not limited thereto.

It should be understood that the terminal devices may be mobile or fixed. The first terminal device 120 and the second terminal device 130 may be access terminals, user equipment (user equipment, UE), subscriber units, subscriber stations, mobile stations, mobile consoles, remote stations, remote terminals, mobile devices, user terminals, terminals, radio communications equipment, user agents, user apparatuses, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved PLMN.

In an LTE system, at least one data radio bearer (DRB) may be established between UE and a base station. The DRB is used to carry data packets of different services. The base station may configure a PBR for each DRB of the UE by using radio resource control (radio resource control, RRC) signaling. When the UE receives an uplink sending resource and allocates the resource to logical channel data of each DRB, the UE needs to ensure that the resource allocated to each logical channel meets a minimum resource requirement, that is, a PBR. In addition, the base station may configure a PBR for each DRB with reference to a GBR of the DRB, to ensure that a transmission rate of each DRB can meet the GBR of the DRB.

In 5G a core network divides data packets generated by different services into data flows (QoS flows), and maps these data flows onto the DRB of the UE for transmission.

By using an existing data transmission method, the UE or the base station can control the transmission rate within each DRB at the MAC layer only when the DRB is transmitted to a MAC layer, that is, control the transmission rate within the DRB on a per DRB basis, to ensure that the transmission rate of the DRB meets the GBR.

According to a data transmission method and apparatus provided in the embodiments of this application, a transmission rate of a data flow mapped onto a DRB can be controlled. To be specific, the transmission rate of the data flow mapped onto the DRB can be controlled on a per data flow basis, to ensure that the transmission rate of the data flow mapped onto the DRB meets a guaranteed flow bit rate GFBR of the data flow.

FIG. 2 is a schematic flowchart of a data transmission method 200 according to an embodiment of this application. The method 200 may be, for example, applied to the wireless communications system shown in FIG. 1, and is performed by a transmit end of data.

S210. Determine a data flow mapped onto a data radio bearer DRB.

S220. Control transmission of the data flow based on a transmission rate of the data flow and a first rate threshold of the data flow.

It should be understood that the method 200 may be used in an uplink data transmission scenario, and may also be used in a downlink data transmission scenario. In the uplink data transmission scenario, the transmit end may be a terminal device. In the downlink data transmission scenario, the transmit end may be a network device, and the network device may be, for example, a base station. This is not limited in this embodiment of this application.

It should also be understood that the method 200 may be performed at a layer of the transmit end by an entity corresponding to the layer. The layer may be a layer located above a packet data convergence protocol (packet data convergence protocol, PDCP) layer, or may be a MAC layer. This is not limited in this embodiment of this application.

Optionally, the transmit end may implement at the layer located above the PDCP layer the following functions: identifying the data flow, mapping the data flow onto the DRB, and other related processing of the data flow. This is not limited in this embodiment of this application.

For example, the layer located above the PDCP layer may be a service data adaptation protocol (service data adaption protocol, SDAP) layer. However, this embodiment of this application is not limited thereto.

Optionally, the transmit end may control, at the MAC layer, the transmission rate of the data flow and a transmission rate of the DRB.

It should be understood that the data flow in this embodiment of this application may be a QoS flow defined in a core network. This is not limited in this embodiment of this application.

Optionally, the transmit end may map the data flow onto the DRB at the SDAP layer. For example, the transmit end may map data flows of a same type onto a same DRB at the SDAP layer based on a data flow type. For example, the transmit end may determine at least one data flow having a similar quality of service (quality of service, QoS) requirement as the data flows of the same type, or determine at least one data flow having a similar priority requirement as the data flows of the same type. This is not limited in this embodiment of this application.

For example, the transmit end may map, at the SDAP layer, at least one data flow whose latency difference is less than a latency threshold onto the same DRB, or at least one data flow whose packet loss rate difference is less than a packet loss rate threshold onto the same DRB.

Optionally, in S210, the transmit end may determine, at the SDAP layer, the data flow mapped onto the DRB, or may determine, at the MAC layer, the data flow mapped onto the DRB. This is not limited in this embodiment of this application.

In an optional embodiment, the transmit end may determine, at the SDAP layer based on a data flow identifier and a mapping relationship between the data flow and the DRB, the data flow mapped onto the DRB.

In another optional embodiment, the transmit end may determine, at the MAC layer based on the data flow identifier carried in a data packet header, the data flow mapped onto the DRB.

In still another optional embodiment, the transmit end may identify, at the MAC layer based on indication information from an upper layer of the MAC layer, the data flow mapped onto the DRB. For example, a data flow to which a current data packet belongs is indicated by using N bits into a data packet header at the upper layer (the SDAP layer or the PDCP layer), or a data flow to which a current data packet belongs is indicated based on a different sequence number (sequence number, SN) in a packet header.

According to the data transmission method provided in this embodiment of this application, the transmit end can identify the data flow mapped onto the DRB, and control the transmission rate of the data flow.

Optionally, in S210, the data flow determined by the transmit end may be a data flow obtained after at least one of the following processing: data packet header compression processing or data packet concatenation processing.

The data packet header compression processing may be, for example, performing, at the SDAP layer according to a packet header compression algorithm, packet header compression on each different data packet in the data flow. The packet header compression algorithm may be a robust header compression (robust header compression, ROHC) algorithm or another packet header compression algorithm.

The data packet concatenation processing is concatenating a plurality of upper-layer data packets (which may be Internet protocol (Internet Protocol, IP) packets or non-IP packets) into one SDAP service data unit (service data unit, SDU) at the SDAP layer, and then adding a corresponding header for transmission. Further, concatenation may be performed on a fixed-size IP packet.

According to the data transmission method provided in this embodiment of this application, the data packet header compression processing and/or the data packet concatenation processing are/is performed on the data packet in the data flow in this way, a transmission data volume of the data packet in the data flow can be reduced, thereby improving transmission efficiency of the data flow.

Optionally, in S220, the transmit end may control, at the SDAP layer, a transmission rate of the data flow when being transmitted to the PDCP layer. Alternatively, the transmit end may control, at the MAC layer, a transmission rate of the data flow when being transmitted to the MAC layer. This is not limited in this embodiment of this application.

It should be understood that the transmission rate of the data flow may be understood as a data volume transmitted in a transmission period. The transmission period may be, for example, a transmission time interval (transmission time interval, TTI). This is not limited in this embodiment of this application.

Optionally, in S220, the transmit end may configure a token bucket (token bucket) for the data flow, and control the transmission rate of the data flow based on a quantity of tokens (token) in a token bucket corresponding to the data flow.

In an optional embodiment, when the quantity of tokens in the token bucket corresponding to the data flow is greater than or equal to a token threshold, the transmit end transmits the data flow; and/or when the quantity of tokens in the token bucket corresponding to the data flow is less than the token threshold, the transmit end suspends transmission of the data flow.

The quantity of tokens in the token bucket corresponding to the data flow is a difference between a first value and a second value. The first value is a quantity of tokens put into the token bucket in a first time period based on the first rate threshold. The second value is a quantity of tokens taken from the token bucket in the first time period based on the transmission rate.

It should be understood that the token threshold may be 0, or may be a non-zero value. This is not limited in this embodiment of this application.

It should also be understood that the first rate threshold of the data flow may be, for example, a GFBR of the data flow.

It should also be understood that a first rate threshold of each of at least one data flow mapped onto the DRB may be separately configured. In other words, the first rate thresholds of the data flows may be the same or different. This is not limited in this embodiment of this application.

It should also be understood that a start moment of the first time period is a moment at which a token is put into the token bucket based on the first rate threshold, and an end moment of the first time period is a moment at which the transmit end determines, based on a quantity of tokens in the token bucket, whether to transmit.

Figure 3:
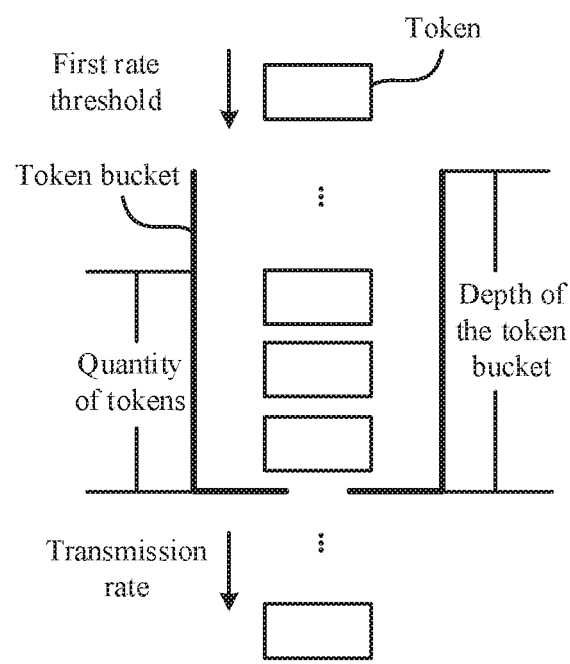
FIG. 3 is a schematic flowchart of controlling transmission based on a token bucket.

FIG. 3 is a schematic diagram of a transmission control method based on a token bucket according to an embodiment of this application. It should be understood that a token bucket mechanism is a commonly used QoS traffic policing method. A token bucket may be understood as an internal storage pool of the transmit end. A token may be understood as a virtual information packet filling the token bucket at a specified rate. The specified rate may be, for example, the first rate threshold.

As shown in FIG. 3, for the token bucket, one token (as shown by using a block in FIG. 3) is put into the token bucket every 1/r second from a moment t1 based on a configured first rate threshold r. If a data packet in the data flow needs to be transmitted when the token is put into the token bucket at the constant rate, the token (as shown by using a bottom block in FIG. 3) in the token bucket is consumed, and different quantities of tokens are consumed for data packets in different sizes.

For example, it is assumed that each token in the token bucket represents one byte. When an n-byte data packet in the data flow arrives at a moment t2, the transmit end needs to determine whether there are enough tokens in the token bucket to be consumed. If the transmit end determines that a quantity of tokens in the token bucket is greater than or equal to n in a first time period between the moment t1 and the moment t2, the transmit end transmits the data packet, and deletes n tokens from the token bucket; however, if the quantity of tokens in the token bucket is less than n, the transmit end does not delete the token, and considers that transmission of the data packet needs to be controlled.

Optionally, a data packet that needs to be controlled may be processed in different manners. For example, the data packet may be discarded; or the data packet may be placed in a queue, and may be transmitted again when enough tokens are accumulated in the token bucket; or the data packet may continue to be sent, but a special mark needs to be added to the data packet. When the transmission rate is overloaded, the data packet with the special mark is discarded. This is not limited in this embodiment of this application.

In addition, if the token in the token bucket is not consumed, or a speed at which the token is consumed is less than a speed at which a token is generated, the quantity of tokens continues to increase until the token bucket is filled, and the token generated later overflows from the bucket (in other words, the token is discarded). Because the token bucket can store b tokens (in other words, a depth of the token bucket is b) at most, a maximum quantity of tokens that can be stored in the token bucket cannot exceed the depth of the bucket.

According to the data transmission method provided in this embodiment of this application, the transmit end can control the transmission rate of the data flow based on a relationship between the token threshold and the quantity of tokens in the token bucket corresponding to the data flow. In this way, the transmission rate of the data flow can meet the first rate threshold of the data flow.

Optionally, in S220, that the transmit end controls the transmission rate of the data flow based on the transmission rate of the data flow and the first rate threshold of the data flow may be that the transmit end controls the transmission rate of the data flow based on the transmission rate of the data flow, the first rate threshold of the data flow, and a second rate threshold of the data flow.

It should also be understood that a second rate threshold of each of the at least one data flow mapped onto the DRB may be separately configured. In other words, the second rate thresholds of the data flows may be the same or different. This is not limited in this embodiment of this application.

Specifically, the transmit end may determine M data packets in the data flow based on the transmission rate of the data flow, the first rate threshold of the data flow, and the second rate threshold of the data flow in a first transmission period, where M is an integer greater than 0; and the transmit end buffers the M data packets.

In an optional embodiment, in the first transmission period, when the transmission rate of the data flow is greater than the first rate threshold of the data flow and is less than or equal to the second rate threshold of the data flow, the transmit end determines the M data packets in the data flow A data volume of the M data packets is a data volume that can be used to transmit based on a first percentage value of the transmission rate of the data flow.

For example, if the transmission rate of the data flow is 1200 kbps, the first rate threshold of the data flow is 1000 kbps, the second rate threshold of the data flow is 1500 kbps, and the first percentage value is 20%, the transmit end may determine that the data volume of the M data packets is 240 kb (that is, 1200 (kb)×20%).

Optionally, in this embodiment of this application, the data volume of the M data packets may be preset, or may be determined based on a difference between the transmission rate of the data flow and the first rate threshold of the data flow; and a preset mapping relationship. The mapping relationship is a correspondence between the difference between the transmission rate of the data flow and the first rate threshold of the data flow and a percentage value. This is not limited in this embodiment of this application.

In another optional embodiment, in the first transmission period, when the transmission rate of the data flow is greater than the first rate threshold of the data flow and is less than or equal to the second rate threshold of the data flow, the transmit end determines the M data packets in the data flow, where M is a difference between a quantity of data packets that can be transmitted according to the transmission rate of the data flow and a quantity of data packets that can be transmitted according to the first rate threshold of the data flow.

For example, if the transmission rate of the data flow is 1200 kbps, the first rate threshold of the data flow is 1000 kbps, and the second rate threshold of the data flow is 1500 kbps, the transmit end may determine that the data volume of the M data packets is 200 kb (that is, 1200 kb-1000 kb).

Optionally, a plurality of data flows are mapped onto the DRB. The plurality of data flows include a first data flow and a second data flow. In the first transmission period, when a transmission rate of the first data flow is greater than a first rate threshold of the first data flow and is less than or equal to a second rate threshold of the first data flow, the transmit end determines P data packets in the first data flow. Herein, P is a difference between a quantity of data packets that can be transmitted according to the transmission rate of the first data flow and a quantity of data packets that can be transmitted according to the first rate threshold of the first data flow, and P is an integer greater than 0. Then, the transmit end determines the M data packets in the P data packets based on a transmission rate of the second data flow and a first rate threshold of the second data flow. A difference between P and M is a difference between a quantity of data packets that can be transmitted according to the first rate threshold of the second data flow and a quantity of data packets that can be transmitted according to the transmission rate of the second data flow, and M is less than or equal to P.

It should be understood that there may be one or more second data flows. This is not limited in this embodiment of this application.

For example, if the transmission rate of the first data flow is 1200 kbps, the first rate threshold of the first data flow is 1000 kbps, and the second rate threshold of the first data flow is 1500 kbps, the transmit end may determine that a data volume of the P data packets is 200 kb (that is, 1200 kb-1000 kb). In this case, the transmission rate of the second data flow is 900 kbps, the first rate threshold of the second data flow is 1000 kbps, and a difference between the transmission rate of the second data flow and the first rate threshold of the second data flow is 100 kbps (that is, 1000 kbps-900 kbps). In other words, the second data flow may "borrow" 100 kbps from the first data flow. Therefore, the transmit end may determine that the data volume of the M data packets in the P data packets is 100 kbps (that is, 200 kbps-100 kbps).

In other words, if the transmission rate of the data flow exceeds the first rate threshold of the data flow and a transmission rate of another data flow is less than a first rate threshold of the another data flow, the transmit end only needs to ensure that a sum of the transmission rate of the data flow and the transmission rate of the another data flow is less than a sum of the first rate threshold of the data flow and the first rate threshold of the another data flow. In other words, the data flow may "borrow" the transmission rate of the another data flow.

Optionally, in the first transmission period, if the transmission rate of the data flow is greater than the second rate threshold of the data flow, the transmit end discards N data packets in the data flow, where N is a difference between the quantity of data packets that can be transmitted according to the transmission rate of the data flow and a quantity of data packets that can be transmitted according to the second rate threshold of the data flow.

According to the data transmission method provided in this embodiment of this application, when the transmission rate of the data flow is greater than the second rate threshold of the data flow, the N data packets are discarded, to effectively control the transmission rate of the data flow and improve transmission efficiency.

It should be understood that each of the first transmission period, a second transmission period, a third transmission period, and a fourth transmission period is any one transmission period of the data flow. This is not limited in this embodiment of this application.

Optionally, the transmit end may process, in different manners, the M data packets buffered in the first transmission period. For example, the transmit end may preferably transmit the M data packets, or may transmit the M data packets when the transmission rate of the data flow is relatively low, or may directly discard the M data packets. This is not limited in this embodiment of this application.

In an optional embodiment, the transmit end may preferably transmit the M data packets in the second transmission period. An end moment of the first transmission period is a start moment of the second transmission period.

Optionally, after the M data packets are buffered in the first transmission period, in the second transmission period, if the transmission rate of the data flow is greater than the first rate threshold of the data flow and is less than or equal to the second rate threshold of the data flow, the transmit end still needs to buffer the M data packets in the data flow A quantity of the M data packets is the difference between the quantity of data packets that can be transmitted according to the transmission rate of the data flow and the quantity of data packets that can be transmitted according to the first rate threshold of the data flow. This is not limited in this embodiment of this application.

In another optional embodiment, the transmit end may transmit the M data packets in the third transmission period. The third transmission period is later than the first transmission period in the third transmission period, the transmission rate of the data flow is less than the first rate threshold of the data flow.

Optionally, after the M data packets are buffered, in a preset second time period, if the transmission rate of the data flow is greater than or equal to the first rate threshold of the data flow, the transmit end discards the M data packets after the second time period ends.

According to the data transmission method provided in this embodiment of this application, the transmit end transmits a data packet buffered in the first transmission period in another transmission period that meets a condition. In this way, a packet loss rate of data transmission can be reduced, thereby improving reliability of data transmission.

In another optional embodiment, after buffering the M data packets, the transmit end may start a timer. If the transmission rate of the data flow is always greater than or equal to a rate threshold of the data flow before the timer expires, the transmit end discards the M data packets after the timer expires.

According to the data transmission method provided in this embodiment of this application, after the second time period after the first transmission period expires, the data packet buffered in the first transmission period is discarded. In this way, an expired buffer can be cleared in time, to avoid the following case in which a new data packet cannot be buffered because an expired data packet occupies a buffer, that is to improve a buffer update rate.

Optionally, in the fourth transmission period, if a transmission rate of the data flow is less than or equal to the first rate threshold of the data flow, the transmit end transmits according to the transmission rate of the data flow. In other words, the transmission rate of the data flow does not need to be controlled.

According to the data transmission method provided in this embodiment of this application, the transmit end controls the transmission rate of the data flow based on the transmission rate of the data flow, the first rate threshold of the data flow, and the second rate threshold of the data flow. In this way, the transmission rate of the data flow can meet the first rate threshold of the data flow and the second rate threshold of the data flow.

In addition, according to the data transmission method provided in this embodiment of this application, each of the plurality of data flows mapped onto the DRB can meet a GFBR of each data flow, to avoid the following case in which in the DRB, a transmission rate of a data flow is affected because a transmission rate of another data flow is overloaded, thereby reducing a transmission latency of the another data flow and improving transmission efficiency.

Figure 4:
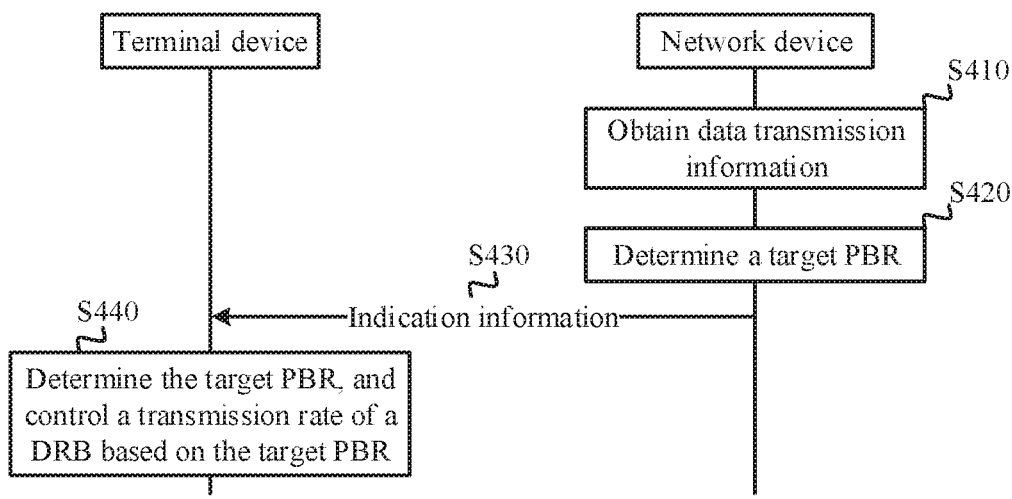
FIG. 4 is a schematic flowchart of another data transmission method according to an embodiment of this application.

FIG. 4 is a schematic flowchart of another data transmission method 400 according to an embodiment of this application. The method 400 may be applied to a wireless communications system shown in FIG. 1. It should be understood that a network device may be, for example, a base station.

S410. The network device obtains data transmission information of a terminal device. The data transmission information includes a transmission rate of each of at least one data flow mapped onto a DRB of the terminal device.

S420. The network device determines a target prioritized bit rate PBR of the DRB based on the data transmission information.

S430. The network device sends indication information to the terminal device. The indication information is used to indicate the target PBR and control a transmission rate of the DRB by using the target PBR. Correspondingly, the terminal device receives the indication information sent by the network device.

S440. The terminal device determines the target PBR based on the indication information and controls the transmission rate of the DRB by using the target PBR.

According to the data transmission method provided in this embodiment of this application, the network device determines the target PBR of the DRB based on the data transmission information, and sends the indication information to the terminal device. The indication information is used to indicate the target PBR and control the transmission rate of the DRB by using the target PBR. In other words, the network device can dynamically adjust the target PBR for the terminal device based on a current transmission status of the terminal device.

Optionally, the data transmission information may include information used to indicate a transmission status of the at least one data flow mapped onto the DRB. For example, the data transmission information may include at least one of the transmission rate of each of the at least one data flow, a difference between a sum of transmission rates of all of the at least one data flow and a sum of first rate thresholds of all the data flows, or a data volume buffered by each of the at least one data flow during transmission. The target PBR is determined. This is not limited in this embodiment of this application.

In an optional embodiment, the data transmission information may include the transmission rate of each of the at least one data flow mapped onto the DRB, and the network device may determine the target PBR based on the transmission rate of each of the at least one data flow and a first rate threshold of each data flow.

It should be understood that the first rate threshold may be a GFBR.

In another optional embodiment, the data transmission information may include the difference between the sum of transmission rates of all of the at least one data flow mapped onto the DRB and the sum of first rate thresholds of all the data flows, and the network device may determine the target PBR based on the difference between the sum of transmission rates of all of the at least one data flow and the sum of first rate thresholds of all the data flows.

For example, it is assumed that the data transmission information includes that a difference between a transmission rate of a first data flow mapped onto the DRB and a first rate threshold of the first data flow is 12 kbps, and a difference between a transmission rate of a second data flow mapped onto the DRB and a first rate threshold of the second data flow is 8 kbps. It is assumed that a current PBR of the DRB is 1500 kbps. In this case, based on the data transmission information, the network device may increase the current PBR of the terminal device by 20 kbps to be used a target PBR. In other words, the network device determines that the target PBR is 1520 kbps. This is not limited in this embodiment of this application.

In another optional embodiment, if at least one data packet is buffered in a transmission process of the data flow mapped onto the DRB, the terminal device may report buffer information to the network device. The buffer information includes the buffered data volume of each of the at least one data flow in a transmission process. The network device may determine the target PBR based on the data transmission information and the buffer information.

For example, it is assumed that the data transmission information includes that a buffered data volume of the first data flow mapped onto the DRB during transmission is 5 kb, and a buffered data volume of the second data flow mapped onto the DRB is 5 kb during transmission. It is assumed that a current PBR of the DRB is 1500 kbps. Based on the buffer information, the network device may increase the current PBR of the terminal device by 10 kbps to be used as the target PBR. In other words, the network device determines that the target PBR is 1510 kbps. This is not limited in this embodiment of this application.

Optionally, in S420, that the network device obtains the data transmission information of the terminal device may be that the terminal device collects the data transmission information at an SDAP layer or a MAC layer, and reports the data transmission information to the network device; or may be that the network device collects the data transmission information of the terminal device. This is not limited in this embodiment of this application.

Optionally, the terminal device may periodically report the data transmission information to the network device, or may be triggered to report the data transmission information to the network device. For example, the terminal device may report the data transmission information according to a reporting period preconfigured by the network device; or the terminal device may be triggered by an event to report the data transmission information, where a trigger event may be configured by the network device. For example, the trigger event may be that the transmission rate of the data flow is greater than the GFBR. This is not limited in this embodiment of this application.

Optionally, the reporting performed by the terminal device may be explicit reporting or implicit reporting. The explicit reporting may be reporting by using RRC signaling or a MAC control element (control element, CE) or by defining a control PDU or a special PDU. The implicit reporting may be adding indication information to a header of the data packet in the data flow. This is not limited in this embodiment of this application.

Optionally, in S430, the indication information may include the target PBR, an adjustment value based on a current PBR, or an index corresponding to an adjustment value based on a current PBR, so that the terminal device determines the target PBR based on the indication information. This is not limited in this embodiment of this application.

For example, a current PBR of the terminal device is 2000 kpbs, the indication information may be that a value of the target PBR is 2500 kbps; or that the adjustment value based on a current PBR is 500 kbps; or that the index corresponding to the adjustment value based on a current PBR is 5, and the adjustment value corresponding to the index 5 is 500 kbps. Correspondingly, after receiving the indication information, the terminal device may determine, based on the indication information, to adjust the current PBR value from 2000 kbps to 2500 kbps.

According to the data transmission method provided in this embodiment of this application, when the target PBR is greater than or equal to the current PBR of the DRB, after receiving the indication information, the terminal device determines the target PBR based on the indication information, updates the current PBR to the target PBR, and controls transmission of the DRB based on the target PBR. Because the PBR is increased, even if the transmission rate of the data flow mapped onto the DRB is greater than the GFBR, the transmission rate of the data flow is not needed to be controlled. In other words, the terminal device does not need to perform buffering or packet discarding processing on the data flow. This helps reduce a transmission latency and a packet loss rate of the data flow, and helps avoid affecting a transmission rate of another data flow.

According to the data transmission method provided in this embodiment of this application, when the target PBR is less than the current PBR of the DRB, after receiving the indication information, the terminal device determines the target PBR based on the indication information, updates the current PBR to the target PBR, and controls the transmission of the DRB based on the target PBR. Because the PBR is reduced, a reduced part of the PBR may be allocated to another DRB, that is, an excess part of the PBR allocated to the current DRB is allocated to the another DRB. In this way, PBR utilization can be improved while the transmission rate of the DRB is ensured. Optionally, a person in the art may decide, based on an actual requirement, an action taken when the target PBR is less than the current PBR of the DRB, for example, suspending sending of the indication information.

Optionally, the indication information may further include at least one of a start effective time, an effective time duration, an end effective time, an effective rule, or a failure rule of controlling the transmission of the DRB by using the target PBR.

Optionally, the terminal device may control the transmission rate of the DRB by using the target PBR in the effective time period, and control the transmission rate of the DRB by still using the PBR before update after the effective time period indicated by the indication information ends.

According to the data transmission method provided in this embodiment of this application, the network device indicates the effective time period of the target PBR to the terminal device by using the indication information, so that the terminal device uses the target PBR in the effective time period. Therefore, time validity of the target PBR is improved.

The foregoing describes the data transmission methods provided in the embodiments of this application with reference to FIG. 1 to FIG. 4. The following describes the data transmission apparatus provided in the embodiments of this application with reference to FIG. 5 to FIG. 10.

Figure 5:
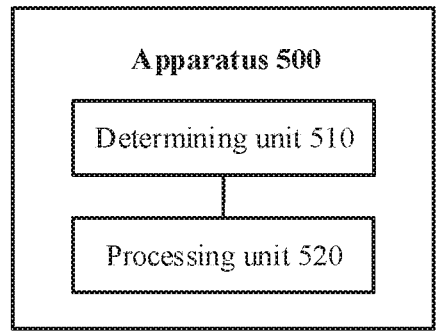
FIG. 5 is a schematic block diagram of a data transmission apparatus according to an embodiment of this application.

FIG. 5 is a schematic block diagram of a data transmission apparatus 500 according to an embodiment of this application. The apparatus 500 includes:

a determining unit 510, configured to determine a data flow mapped onto a data radio bearer DRB; and a processing unit 520, configured to control a transmission rate of the data flow based on the transmission rate of the data flow determined by the determining unit and a first rate threshold of the data flow.

Optionally, the processing unit is specifically configured to: control, based on the transmission rate of the data flow and the first rate threshold of the data flow, a transmission rate of the data flow when being transmitted to a packet data convergence protocol PDCP layer; or control, based on the transmission rate of the data flow and the first rate threshold of the data flow, a transmission rate of the data flow when being transmitted to a medium access control MAC layer.

Optionally, the processing unit is specifically configured to: when a quantity of tokens in a token bucket corresponding to the data flow is greater than or equal to a token threshold, transmit the data flow; where the quantity of tokens is a difference between a first value and a second value, the first value is a quantity of tokens put into the token bucket in a first time period based on the first rate threshold of the data flow, and the second value is a quantity of tokens taken from the token bucket in the first time period based on the transmission rate of the data flow; and/or when the quantity of tokens in the token bucket is less than the token threshold, suspend transmission of the data flow.

Optionally, the processing unit is specifically configured to control the transmission rate of the data flow based on the transmission rate of the data flow, the first rate threshold of the data flow, and a second rate threshold of the data flow, where the second rate threshold of the data flow is greater than or equal to the first rate threshold of the data flow.

Optionally, the processing unit is specifically configured to: determine M data packets in the data flow based on the transmission rate of the data flow, the first rate threshold of the data flow, and the second rate threshold of the data flow in a first transmission period, where M is an integer greater than 0; and buffer the M data packets.

Optionally, the processing unit is specifically configured to: in the first transmission period, when the transmission rate of the data flow is greater than the first rate threshold of the data flow and is less than or equal to the second rate threshold of the data flow determine the M data packets, where M is a difference between a quantity of data packets that can be transmitted according to the transmission rate of the data flow and a quantity of data packets that can be transmitted according to the first rate threshold of the data flow.

Optionally, if a plurality of data flows are mapped onto the DRB, and the plurality of data flows include the data flow and another data flow, the processing unit is specifically configured to: in the first transmission period, when the transmission rate of the data flow is greater than the first rate threshold of the data flow and is less than or equal to the second rate threshold of the data flow, determine P data packets in the data flow; where P is a difference between a quantity of data packets that can be transmitted according to the transmission rate of the data flow and a quantity of data packets that can be transmitted according to the first rate threshold of the data flow, and P is an integer greater than 0; and determine the M data packets in the P data packets based on a transmission rate of the another data flow and a first rate threshold of the another data flow, where a difference between P and M is a difference between a quantity of data packets that can be transmitted according to the first rate threshold of the another data flow and a quantity of data packets that can be transmitted according to the transmission rate of the another data flow.

Optionally, the processing unit is specifically configured to: after buffering the M data packets, in a preset second time period, if the transmission rate of the data flow is greater than or equal to the first rate threshold of the data flow, discard the NI data packets after the second time period ends.

Optionally, the processing unit is further configured to: in the first transmission period. When the transmission rate of the data flow is greater than the second rate threshold of the data flow, discard N data packets in the data flow, where N is a difference between the quantity of data packets that can be transmitted according to the transmission rate of the data flow and a quantity of data packets that can be transmitted according to the second rate threshold of the data flow, and N is an integer greater than 0.

In an optional example, a person skilled in the art may understand that the apparatus 500 may be specifically the transmit end in the foregoing method embodiment. The apparatus 500 may be configured to perform procedures and/or steps corresponding to the transmit end in the foregoing method embodiment. To avoid repetition, details are not described herein again.

It should be understood that the apparatus 500 herein may be implemented in a form of a function unit. The term "unit" herein may refer to an application-specific integrated circuit (application-specific integrated circuit, ASIC), an electronic circuit, a processor configured to execute one or more software or firmware program (for example, a shared processor, a dedicated processor, or a group processor) and a memory, a combined logic circuit, and/or another appropriate component that supports the described functions.

Figure 6:
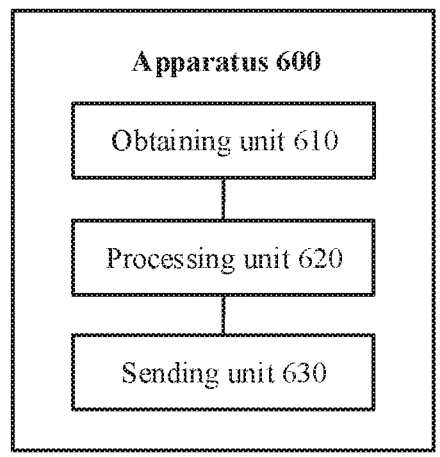
FIG. 6 is a schematic block diagram of another data transmission apparatus according to an embodiment of this application.

FIG. 6 is a schematic block diagram of another data transmission apparatus 600 according to an embodiment of this application. The apparatus 600 includes:

an obtaining unit 610, configured to obtain data transmission information of a terminal device, where the data transmission information includes a transmission rate of each of at least one data flow mapped onto a DRB of the terminal device;

a processing unit 620, configured to determine a target prioritized bit rate PBR of the DRB based on the data transmission information obtained by the obtaining unit 610; and a sending unit 630, configured to send indication information to the terminal device, where the indication information is used to indicate the target PBR and control a transmission rate of the DRB by using the target PBR.

According to the data transmission apparatus provided in this embodiment of this application, a network device determines the target PBR of the DRB based on the data transmission formation, and sends the indication information to the terminal device. The indication information is used to indicate the target PBR and control the transmission rate of the DRB by using the target PBR. In other words, the network device can dynamically adjust the target PBR for the terminal device based on a current transmission status of the terminal device.

Optionally, the data transmission information may include information used to indicate a transmission status of the at least one data flow. For example, the data transmission information may include at least one of the following: the transmission rate of each of the at least one data flow, a difference between a sum of transmission rates of all of the at least one data flow and a sum of first rate thresholds of all the data flows, or a data volume buffered by each of the at least one data flow during transmission. The target PBR is determined. This is not limited in this embodiment of this application.

Optionally, the data transmission information includes the transmission rate of each of the at least one data flow, and the processing unit 620 is specifically configured to: determine the target PBR based on the transmission rate of each of the at least one data flow and a first rate threshold of each data flow.

It should be understood that the first rate threshold may be a GFBR.

Optionally, the data transmission information includes the difference between the sum of transmission rates of all of the at least one data flow and the sum of first rate thresholds of all the data flows, and the processing unit 620 is specifically configured to: determine the target PBR based on the difference between the sum of transmission rates of all of the at least one data flow and the sum of first rate thresholds of all the data flows.

Optionally, if at least one data packet is buffered in a transmission process of the data flow mapped onto the DRB, the processing unit 620 is specifically configured to: receive buffer information reported by the terminal device, where the buffer information includes a data volume buffered in a transmission process of each of the at least one data flow mapped onto the DRB. The processing unit 620 is specifically configured to: determine the target PBR based on the data transmission information and the buffer information.

Optionally, the indication information may further include at least one of the following: a start effective time, an effective time duration, an end effective time, an effective rule, or a failure rule of controlling the transmission rate of each of the at least one data flow by using the target PBR.

In an optional example, a person skilled in the art may understand that the apparatus 600 may be specifically the network device in the foregoing method embodiment. The apparatus 600 may be configured to perform procedures and/or steps corresponding to the network device in the foregoing method embodiment. To avoid repetition, details are not described herein again.

It should be understood that the apparatus 600 herein may be implemented in a form of a function unit. The term "unit" herein may be an ASIC, an electronic circuit, a processor (for example, a shared processor, a dedicated processor, or a group processor) configured to execute one or more software or firmware programs and a memory, a combined logic circuit, and/or another appropriate component that supports the described functions.

Figure 7:
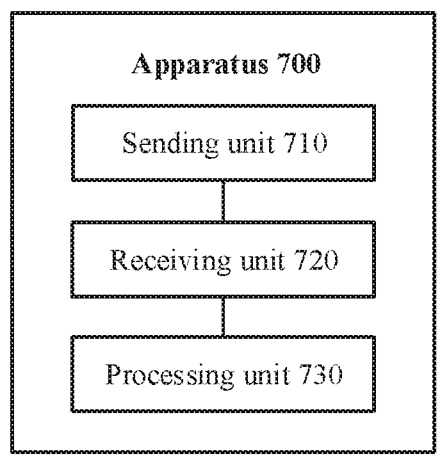
FIG. 7 is a schematic block diagram of still another data transmission apparatus according to an embodiment of this application.

FIG. 7 is a schematic block diagram of still another data transmission apparatus 700 according to an embodiment of this application. The apparatus 700 includes:

a sending unit 710, configured to send data transmission information to a network device, where the data transmission information includes a transmission rate of each of at least one data flow mapped onto a data radio bearer DRB of a terminal device;

a receiving unit 720, configured to receive indication information sent by the network device based on the data transmission information sent by the sending unit 710, where the indication information is used to indicate a target PBR and control a transmission rate of the DRB by using the target PBR; and a processing unit 730, configured to: determine the target PBR based on the indication information received by the receiving unit 720, and control the transmission rate of the DRB by using the target PBR.

According to the data transmission apparatus provided in this embodiment of this application, when the target PBR is greater than or equal to a current PBR of the DRB, after receiving the indication information, the terminal device determines the target PBR based on the indication information, updates the current PBR to the target PBR, and controls transmission of the DRB based on the target PBR. Because the PBR is increased, even if a transmission rate of a data flow mapped onto the DRB is greater than a GFBR, the transmission rate of the data flow is not needed to be controlled. In other words, the terminal device does not need to perform buffering or packet discarding processing on the data flow. This helps reduce a transmission latency and a packet loss rate of the data flow, and helps avoid affecting a transmission rate of another data flow.

According to the data transmission apparatus provided in this embodiment of this application, when the target PBR is less than the current PBR of the DRB, after receiving the indication information, the terminal device determines the target PBR based on the indication information, updates the current PBR to the target PBR, and controls the transmission of the DRB based on the target PBR. Because the PBR is reduced, a reduced part of the PBR may be allocated to another DRB, that is, an excess part of the PBR allocated to the current DRB is allocated to the another DRB. In this way, PBR utilization can be improved while the transmission rate of the DRB is ensured.

Optionally, the data transmission information may include at least one of the following: the transmission rate of each of the at least one data flow, a difference between a sum of transmission rates of all of the at least one data flow and a sum of first rate thresholds of all the data flows, or a data volume buffered in a transmission process of each of the at least one data flow. The target PBR is determined. This is not limited in this embodiment of this application.

It should be understood that the first rate threshold may be a GRIR.

In a possible implementation, if at least one data packet is buffered in a transmission process of the data flow mapped onto the DRB the sending unit 720 is further configured to: report buffer information to the network device, where the buffer information includes a data volume buffered in a transmission process of each of the at least one data flow mapped onto the DRB the processing unit 730 is specifically configured to: receive the indication information sent by the network device based on the data transmission information and the buffer information.

Optionally, the indication information may further include at least one of the following: a start effective time, an effective time duration, an end effective time, an effective rule, or a failure rule of controlling the transmission rate of each of the at least one data flow by using the target PBR.

Optionally, the terminal device may control the transmission rate of each data flow by using the target PBR in an effective time period, and control the transmission rate of the DRB by still using the PBR before update after the effective time period indicated by the indication information ends.

In an optional example, a person skilled in the art may understand that the apparatus 700 may be specifically the terminal device in the foregoing method embodiment, and the apparatus 700 may be configured to perform procedures and/or steps corresponding to the terminal device in the foregoing method embodiment. To avoid repetition, details are not described herein again.

It should be understood that the apparatus 700 herein may be implemented in a form of a function unit. The term "unit" herein may be an ASIC, an electronic circuit, a processor (for example, a shared processor, a dedicated processor, or a group processor) configured to execute one or more software or firmware programs and a memory, a combined logic circuit, and/or another appropriate component that supports the described functions.

Figure 8:
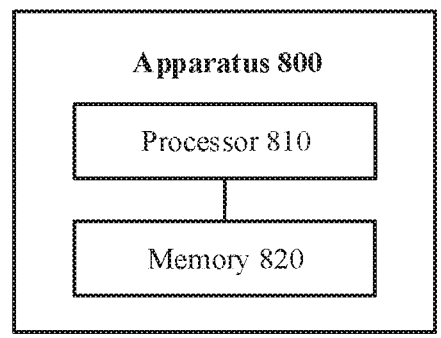
FIG. 8 is a schematic block diagram of still another data transmission apparatus according to an embodiment of this application.

FIG. 8 is a schematic block diagram of still another data transmission apparatus 800 according to an embodiment of this application. The apparatus 800 includes a processor 810 and a memory 820.

The processor 810 is specifically configured to: determine a data flow mapped onto a data radio bearer DRB; and control a transmission rate of the data flow based on the transmission rate of the data flow and a first rate threshold of the data flow.

It should be understood that the apparatus 800 may be specifically the transmit end of data in the foregoing embodiment, and may be configured to perform steps and/or procedures corresponding to the transmit end of data in the foregoing methods. Optionally, the memory 820 may include a read-only memory and a random access memory, and provide an instruction and data to the processor. A part of the memory may further include a non-volatile random access memory. For example, the memory may further store information about a device type. The processor 810 may be configured to execute the instruction stored in the memory. In addition, when the processor 810 executes the instruction stored in the memory, the processor 810 is configured to perform the steps and/or the procedures corresponding to the transmit end of data in the foregoing embodiment.

It should be understood that, the processor of the foregoing apparatus in this embodiment of this application may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logical device, a discrete gate or a transistor logical device, a discrete hardware component, or the like. The general-purpose processor may be a microprocessor, or the processor may be any conventional processor or the like.

Figure 9:
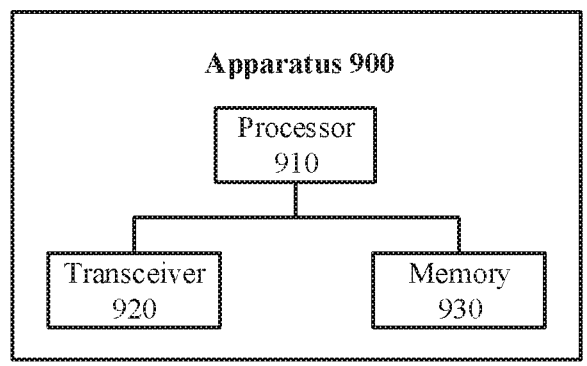
FIG. 9 is a schematic block diagram of still another data transmission apparatus according to an embodiment of this application.

FIG. 9 is a schematic block diagram of still another data transmission apparatus 900 according to an embodiment of this application. The apparatus 900 includes a processor 910, a transceiver 920, and a memory 930. The processor 910, the transceiver 920, and the memory 930 communicate with each other by using an internal connection channel. The memory 930 is configured to store an instruction. The processor 910 is configured to execute the instruction stored in the memory 930, to control the transceiver 920 to send a signal and/or receive a signal.

The transceiver 920 is configured to obtain data transmission information of a terminal device, where the data transmission information includes a transmission rate of each of at least one data flow mapped onto a data radio bearer DRB of the terminal device. The processor 910 is configured to determine a target prioritized bit rate PBR of the DRB based on the data transmission information. The transceiver 920 is further configured to: if the target PBR is greater than a current PBR of the DRB, send indication information to the terminal device, where the indication information is used to indicate the target PBR and control the transmission rate of each of the at least one data flow by using the target PBR.

It should be understood that the apparatus 900 may be specifically the network device in the foregoing embodiment, and may be configured to perform steps and/or procedures corresponding to the network device in the foregoing method. Optionally, the memory 930 may include a read-only memory and a random access memory, and provide an instruction and data to the processor. A part of the memory may further include a non-volatile random access memory. For example, the memory may further store information about a device type. The processor 910 may be configured to execute the instruction stored in the memory. In addition, when the processor 910 executes the instruction stored in the memory, the processor 910 is configured to perform the steps and/or the procedures corresponding to the network device in the foregoing embodiment.

It should be understood that in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

Figure 10:
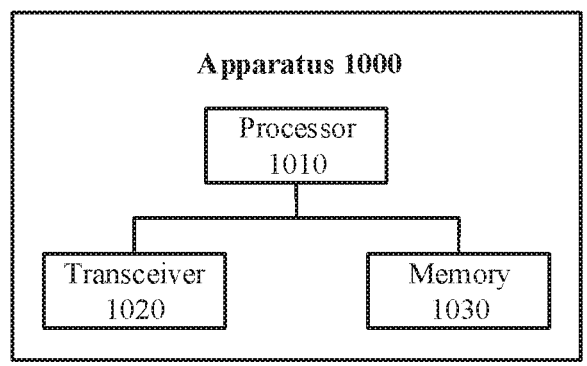
FIG. 10 is a schematic block diagram of still another data transmission apparatus according to an embodiment of this application.

FIG. 10 is a schematic block diagram of still another data transmission apparatus 1000 according to an embodiment of this application. The apparatus 1000 includes a processor 1010, a transceiver 1020, and a memory 1030. The processor 1010, the transceiver 1020, and the memory 1030 communicate with each other by using an internal connection channel. The memory 1030 is configured to store an instruction. The processor 1010 is configured to execute the instruction stored in the memory 1030, to control the transceiver 1020 to send a signal and/or receive a signal.

The transceiver 1020 is configured to: send data transmission information to a network device, where the data transmission information includes a transmission rate of each of at least one data flow mapped onto a DRB; and receive indication information sent by the network device based on the data transmission information, where the indication information is used to indicate the target PBR and control the transmission rate of each of the at least one data flow by using the target PBR. The processor 1010 is configured to: determine the target PBR based on the indication information and control the transmission rate of each of the at least one data flow by using the target PBR.

It should be understood that the apparatus 1000 may be specifically the terminal device in the foregoing embodiment, and may be configured to perform steps and/or procedures corresponding to the terminal device in the foregoing method. Optionally, the memory 1030 may include a read-only memory and a random access memory, and provide an instruction and data to the processor. A part of the memory may further include a non-volatile random access memory. For example, the memory may further store information about a device type. The processor 1010 may be configured to execute the instruction stored in the memory. In addition, when the processor 1010 executes the instruction stored in the memory, the processor 1010 is configured to perform the steps and/or the procedures corresponding to the terminal device in the foregoing embodiment.

It should be understood that in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

Figure 11:
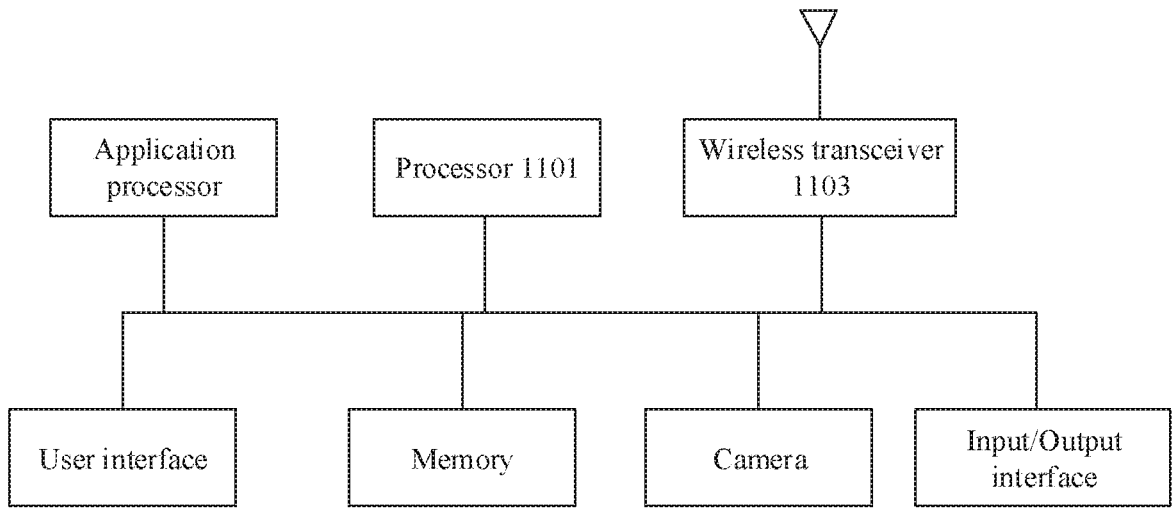
FIG. 11 is a schematic block diagram of still another data transmission apparatus according to an embodiment of this application.

When the data transmission apparatus in the embodiments is a terminal device, reference may be made to a device shown in FIG. 11. The device includes a processor 1101, an application processor, a memory, a user interface, and some other elements (including a device such as a power supply that is not shown). The determining unit 510 and the processing unit 520 in FIG. 5, or the processing unit 730 in FIG. 7 may be the processor 1101, and implement corresponding functions. The sending unit 710 and the receiving unit 720 in FIG. 7 may be a wireless transceiver 1103 in FIG. 11, and the wireless transceiver 1103 implements corresponding functions by using an antenna. It may be understood that the elements shown in the figure are merely examples, and are not required for completing the embodiments.

Figure 12:
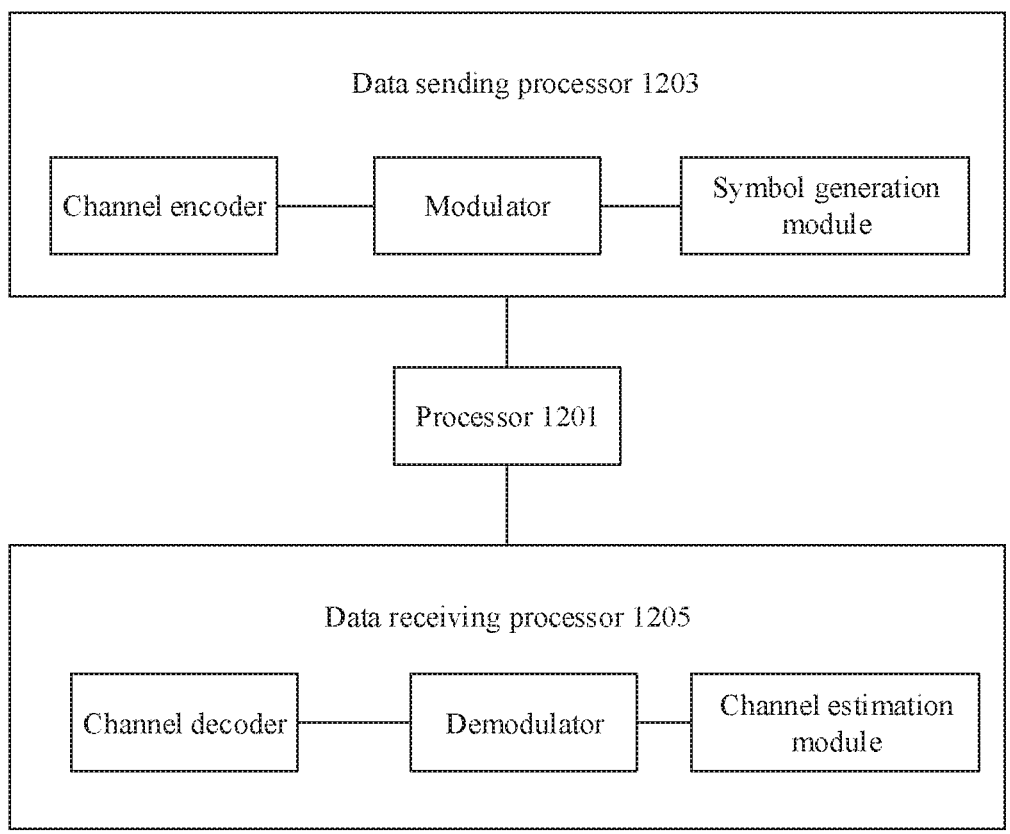
FIG. 12 is a schematic block diagram of still another data transmission apparatus according to an embodiment of this application.

When the data transmission apparatus in the embodiments is a terminal device, reference may be made to a device shown in FIG. 12. In an example, the device may implement functions similar to those of the processor in FIG. 11. In FIG. 12, the device includes a processor 1201, a data sending processor 1203, and a data receiving processor 1205. In FIG. 12, the determining unit 510 and the processing unit 520 in FIG. 5, or the processing unit 730 in FIG. 7 may be the processor 1201 in FIG. 12. The sending unit 710 and the receiving unit 720 in FIG. 7 may be the data receiving processor 1205 in FIG. 12. Although a channel encoder and a channel decoder are shown in the figure, it may be understood that these modules are merely examples and do not constitute a limiting description of the embodiments.

Figure 13:
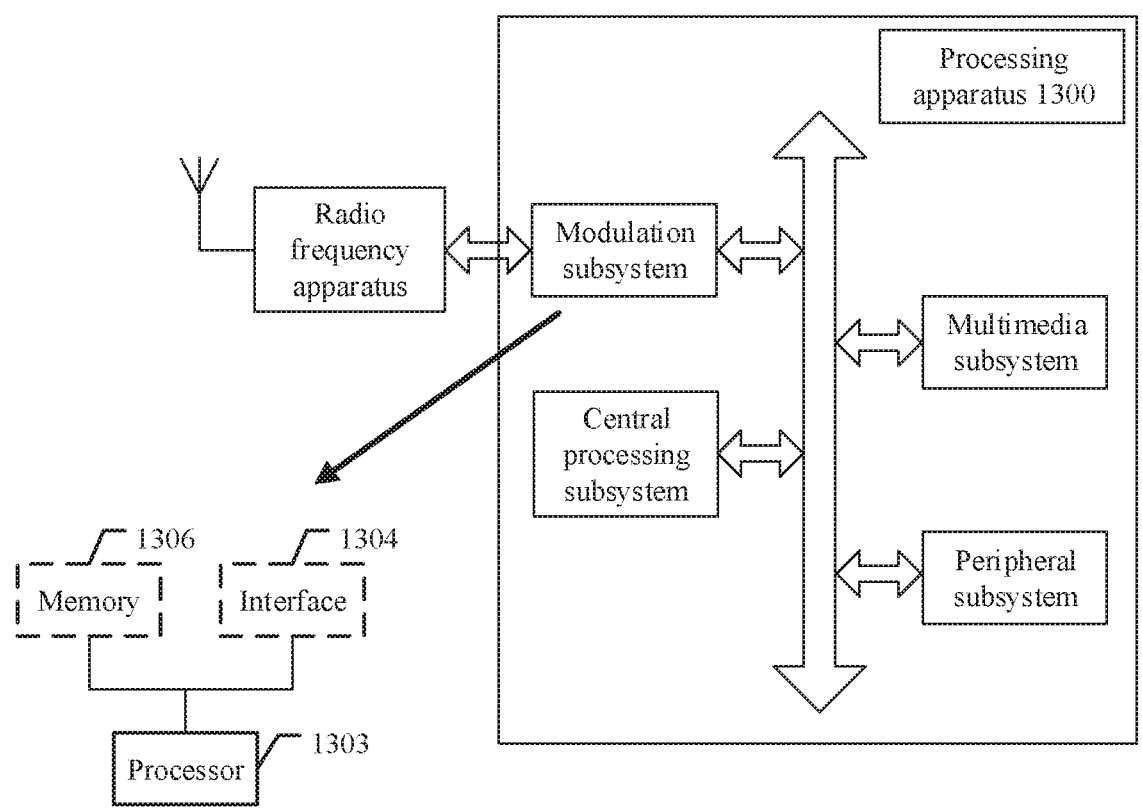
FIG. 13 is a schematic block diagram of a processing apparatus according to an embodiment of this application.

FIG. 13 shows another form of the embodiments of this application. A processing apparatus 1300 includes modules such as a modulation subsystem, a central processing subsystem, and a peripheral subsystem. The data transmission apparatus in the embodiments may be used as the modulation subsystem. Specifically, the modulation subsystem may include a processor 1303 and an interface 1304. The processor 1303 implements functions of the determining unit 510 and the processing unit 520 in FIG. 5 or functions of the processing unit 730 in FIG. 7, and the interface 1304 implements functions of the sending unit 710 and the receiving unit 720 in FIG. 7. In another variant, the modulation subsystem includes a memory 1306, the processor 1303, and a program that is stored in the memory and that runs on the processor, and when executing the program, the processor implements the method in the foregoing embodiments. It should be noted that the memory 1306 may be non-volatile or may be volatile, and the memory 1306 may be located in the modulation subsystem or may be located in the processing apparatus 1300 provided that the memory 1306 can be connected to the processor 1303.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean performing sequences in various embodiments of this application. The performing sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, reference may be made to a corresponding process in the foregoing method embodiments for a detailed working process of the foregoing system, apparatus, and unit. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units. In other words, the units may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD), a semiconductor medium (for example, a solid state disk (solid state disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by a transmit end comprising a processor, a data flow mapped onto a data radio bearer (DRB); and
    controlling, by the transmit end, a transmission rate of the data flow based on the transmission rate of the data flow, a first rate threshold of the data flow, and a second rate threshold of the data flow, the second rate threshold of the data flow being greater than or equal to the first rate threshold of the data flow;
    determining, by the transmit end, M data packets in the data flow based on the transmission rate of the data flow, the first rate threshold of the data flow, and the second rate threshold of the data flow in a first transmission period, wherein M is an integer greater than 0;
    buffering, by the transmit end, the M data packets; and
    discarding, by the transmit end, the M data packets based on a determination that the transmission rate of the data flow is greater than or equal to the first rate threshold of the data flow in a preset period of time after buffering the M data packets.

2. The method according to claim 1, wherein the transmission rate is controlled when the data flow is transmitted to a packet data convergence protocol (PDCP) layer, or when the data flow is transmitted to a medium access control (MAC) layer.

3. The method according to claim 1, wherein
    the data flow is transmitted based on a determination that a quantity of tokens in a token bucket corresponding to the data flow is greater than or equal to a token threshold,
    the quantity of tokens is a difference between a first value and a second value, the first value is a quantity of tokens put into the token bucket in a first time period based on the first rate threshold of the data flow, and the second value is a quantity of tokens taken from the token bucket in the first time period based on the transmission rate of the data flow, and
    the transmission of the data flow is suspended based on a determination that the quantity of tokens in the token bucket is less than the token threshold.

4. The method according to claim 1, wherein the transmit end determines the M data packets in the first transmission period when the transmission rate of the data flow is greater than the first rate threshold of the data flow and is less than or equal to the second rate threshold of the data flow, and
    M is a difference between a first quantity of data packets that can be transmitted according to the transmission rate of the data flow and a second quantity of data packets that can be transmitted according to the first rate threshold of the data flow.

5. The method according to claim 1, wherein the data flow is a first data flow, a plurality of data flows are mapped onto the DRB, the plurality of data flows comprises the first data flow and a second data flow, and the method further comprises:
    determining, by the transmit end, P data packets in the first data flow, the transmit end determining the P data packets in the first transmission period when the transmission rate of the first data flow is greater than the first rate threshold of the first data flow and is less than or equal to the second rate threshold of the first data flow, wherein P is a difference between a first quantity of data packets that can be transmitted according to the transmission rate of the first data flow and a second quantity of data packets that can be transmitted according to the first rate threshold of the first data flow, and P is an integer greater than 0; and
    determining, by the transmit end, the M data packets in the P data packets based on a transmission rate of the second data flow and a first rate threshold of the second data flow, wherein a difference between P and M is a difference between a third quantity of data packets that can be transmitted according to the first rate threshold of the second data flow and a fourth quantity of data packets that can be transmitted according to the transmission rate of the second data flow.

6. The method according to claim 1, further comprising:
    discarding, by the transmit end, N data packets in the data flow in the first transmission period based on a determination that the transmission rate of the data flow is greater than the second rate threshold of the data flow, wherein
    N is a difference between a first quantity of data packets that can be transmitted according to the transmission rate of the data flow and a second quantity of data packets that can be transmitted according to the second rate threshold of the data flow, and
    N is an integer greater than 0.

7. An apparatus, comprising:
at least one processor; and
a non-transitory computer-readable medium having computer-readable instructions stored thereon that, when executed by the at least one processor, cause the apparatus to:
determine a data flow mapped onto a data radio bearer (DRB); and
control a transmission rate of the data flow based on the transmission rate of the data flow, a first rate threshold of the data flow, and a second rate threshold of the data flow, the second rate threshold of the data flow being greater than or equal to the first rate threshold of the data flow;
determine M data packets in the data flow based on the transmission rate of the data flow, the first rate threshold of the data flow, and the second rate threshold of the data flow in a first transmission period, wherein M is an integer greater than 0;
buffer the M data packets; and
discard the M data packets based on a determination that the transmission rate of the data flow is greater than or equal to the first rate threshold of the data flow in a preset period of time after buffering the M data packets.

8. The apparatus according to claim 7, wherein the transmission rate of the data flow is controlled when the data flow is transmitted to a packet data convergence protocol (PDCP) layer, when the data flow is transmitted to a medium access control (MAC) layer.

9. The apparatus according to claim 7, wherein
the data flow is transmitted based on a determination that a quantity of tokens in a token bucket corresponding to the data flow is greater than or equal to a token threshold,
the quantity of tokens is a difference between a first value and a second value, the first value is a quantity of tokens put into the token bucket in a first time period based on the first rate threshold of the data flow, and the second value is a quantity of tokens taken from the token bucket in the first time period based on the transmission rate of the data flow, and
the transmission of the data flow is suspended based on a determination that the quantity of tokens in the token bucket is less than the token threshold.

10. The apparatus according to claim 7, wherein the apparatus is further caused to:
determine the M data packets in the first transmission period when the transmission rate of the data flow is greater than the first rate threshold of the data flow and is less than or equal to the second rate threshold of the data flow,
wherein M is a difference between a quantity of data packets that can be transmitted according to the transmission rate of the data flow and a quantity of data packets that can be transmitted according to the first rate threshold of the data flow.

11. The apparatus according to claim 7, wherein the data flow is a first data flow, a plurality of data flows are mapped onto the DRB, the plurality of data flows comprises the first data flow and a second data flow, and the apparatus is further caused to:
determine P data packets in the first data flow in the first transmission period when the transmission rate of the first data flow is greater than the first rate threshold of the first data flow and is less than or equal to the second rate threshold of the first data flow, wherein P is a difference between a first quantity of data packets that can be transmitted according to the transmission rate of the first data flow and a second quantity of data packets that can be transmitted according to the first rate threshold of the first data flow, and P is an integer greater than 0; and
determine the M data packets in the P data packets based on a transmission rate of the second data flow and a first rate threshold of the second data flow, wherein a difference between P and M is a difference between a third quantity of data packets that can be transmitted according to the first rate threshold of the second data flow and a fourth quantity of data packets that can be transmitted according to the transmission rate of the second data flow.

12. The apparatus according to claim 7, wherein the apparatus is further caused to:
discard N data packets in the data flow in the first transmission period based on a determination that the transmission rate of the data flow is greater than the second rate threshold of the data flow,
wherein
N is a difference between a first quantity of data packets that can be transmitted according to the transmission rate of the data flow and a second quantity of data packets that can be transmitted according to the second rate threshold of the data flow, and
N is an integer greater than 0.

13. A non-transitory computer-readable medium having computer-readable instructions stored thereon that, when executed by at least one processor, cause an apparatus to:
determine a data flow mapped onto a data radio bearer (DRB); and
control a transmission rate of the data flow based on the transmission rate of the data flow, a first rate threshold of the data flow, and a second rate threshold of the data flow, the second rate threshold of the data flow being greater than or equal to the first rate threshold of the data flow;
determine M data packets in the data flow based on the transmission rate of the data flow, the first rate threshold of the data flow, and the second rate threshold of the data flow in a first transmission period, wherein M is an integer greater than 0;
buffer the M data packets; and
discard the M data packets based on a determination that the transmission rate of the data flow is greater than or equal to the first rate threshold of the data flow in a preset period of time after buffering the M data packets.

14. The non-transitory computer-readable medium according to claim 13, wherein
the data flow is transmitted based on a determination that a quantity of tokens in a token bucket corresponding to the data flow is greater than or equal to a token threshold,
the quantity of tokens is a difference between a first value and a second value, the first value is a quantity of tokens put into the token bucket in a first time period based on the first rate threshold of the data flow, and the second value is a quantity of tokens taken from the token bucket in the first time period based on the transmission rate of the data flow, and
the transmission of the data flow is suspended based on a determination that the quantity of tokens in the token bucket is less than the token threshold.

* * * * *